Dec. 20, 1949  E. C. CROWTHER  2,492,115
RETAINER WASHER DEVICE
Filed June 25, 1945
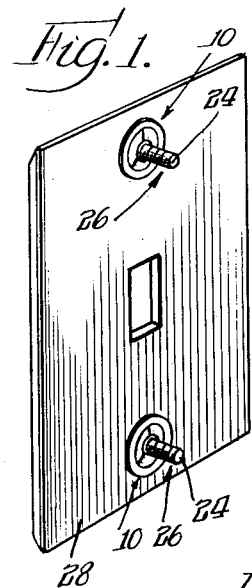
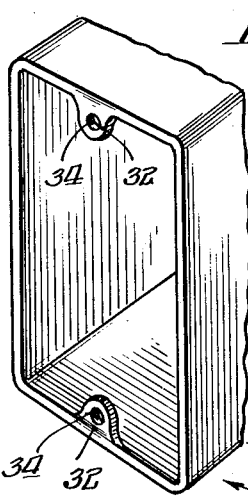
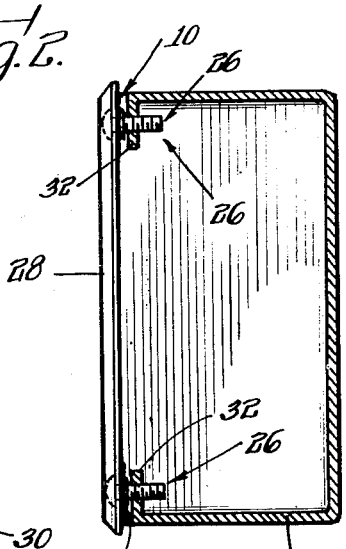
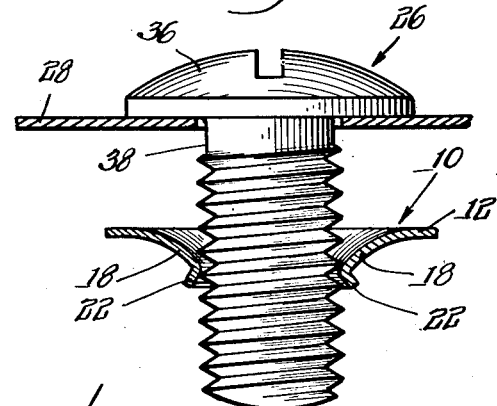
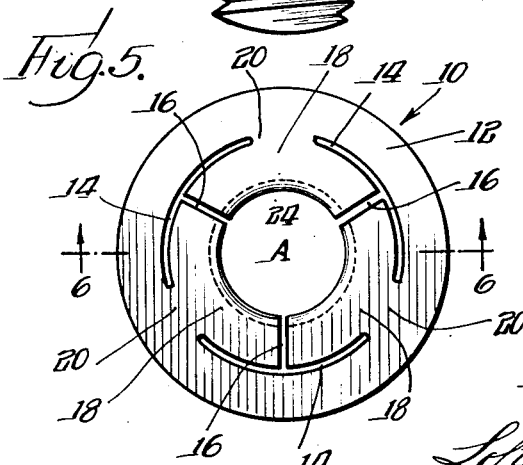
INVENTOR.
Edmond C. Crowther
BY
Loftus Moore, Olson & Trexler
Attys Patented Dec. 20, 1949

2,492,115

UNITED STATES PATENT OFFICE 2,492,115

RETAINER WASHER DEVICE

Edmond C. Crowther, Philadelphia, Pa., assignor to Illinois Tool Works, Chicago, Ill., a corporation of Illinois Application June 25, 1945, Serial No. 601,462

6 Claims. (Cl. 85—5)

This invention relates generally to retainers for stud fasteners such as screws, and more particularly to a thin sheet metal, washer-like fastener which may be telescopically associated with the shank of a fastener after the fastener has been inserted through a work aperture, whereby to prevent dislodgment of the fastener from the work.

There are many instances where stud fasteners such as screws are employed to detachably secure parts in place. In such applications, there is ever present the danger of losing one or more of the screws after the part has been removed. For example, it is common practice to secure the cover or plate of a conventional wall switch by means of two screws. In order to gain access to the switch mechanism both of these screws must be removed and the cover or plate detached. Unless considerable care is exercised in handling the screws and detached plate, these screws will become separated from the plate with the result that they fall to the floor and are lost. The foregoing is one of many of numerous examples where it would be advantageous to provide means for preventing separation of the screws from a workpiece or plate. The present invention contemplates the provision of an extremely simple yet very practical sheet metal device of washer-like form which may be telescopically associated with the shank of a stud fastener such as a screw with a minimum amount of effort and skill.

If a washer of relatively thin sheet stock is employed adjacent the head of a screw for the purpose of securing the screw in place there may be a tendency for the inner margin of the washer to rotatably follow within the helical groove of the thread and thus become detached from the screw. With this thought in mind, the present invention contemplates a retainer of the type set forth above wherein the inner margin of the retainer is of sufficient axial width to prevent inadvertent unscrewing of the fastener and washer. More specifically the invention proposes a retainer washer of relatively thin stock provided with an inner flange portion which will afford the required increase in axial dimension to prevent back-tracking of the washer within the valley of the screw thread after it has once been telescopically urged to its final screw retaining position.

Still more specifically the invention contemplates a simple yet efficiently operable retainer device as set forth above wherein the inner margin of a sheet metal washer element is provided with a novel arrangement of circumferentially extending resilient fingers which provide a substantial circumferential area defining the washer aperture.

The foregoing and other objects and advantages will be more apparent from the following detailed description when considered in connection with the accompanying drawing wherein Figure 1 is a perspective view of a wall switch box and a detached cover which is equipped with retainer devices of the type contemplated by the present invention.

Figure 2 is a central vertical section of the switch box and cover illustrated in Figure 1 when the cover occupies its attached position with respect to the switch box.

Figure 3 illustrates the manner in which a fastener retainer device of the type contemplated by the present invention is initially associated with the fastener element or screw.

Figure 4 is a view similar to Figure 3 illustrating the final screw retaining position occupied by the retainer washer upon completion of telescopic association therewith of the screw member.

Figure 5 is a plan view of the retainer washer illustrated in Figures 3 and 4; and Figure 6 is a transverse sectional view of the retainer washer taken substantially along the line 6—6 of Figure 5.

Referring now to the drawing wherein like numerals have been employed to designate similar parts throughout the various views, it will be seen that one embodiment of the present invention constitutes a retainer washer designated generally by the numeral 10. The washer 10 includes an outer annular body portion 12 which is preferably of substantially continuous form. In fact, the disclosed embodiment constitutes a continuous annular body of relatively thin sheet metal stock. The inner margin of the washer is formed with arcuate severances 14 and radial severances 16 so as to present three resilient fingers 18 of equal size. These fingers 18 are joined with the annular body 12 by sections 20 of relatively small circumferential extent. Each finger comprises an arcuate section which is connected at its intermediate portion with the annular body 12 by said connecting section 20.

Particular attention is directed to the fact that the inner margins of the resilient fingers 18 cooperate to provide a circular margin of substantial circumferential extent, and these margins are bent laterally to provide flanges 22. The normal internal diameter of the central aperture 24 which is defined by the flanges 22 is designated by the letter A, Figures 5 and 6. This diameter A is slightly less than the outer diameter of a screw shank 24 of a screw designated generally by the numeral 26. For the purpose of illustrating one practical application of the invention, it has been shown in operative association with a cover plate 28 for a conventional switch box 30, Figures 1 and 2. Such plates are usually secured to a switch box by a pair of screws which are adapted to be received within threaded apertures 32 of ears 34 formed integral with opposite walls of the box 30. Each screw 26 is inserted through complementary apertures in the cover plate 28 as clearly illustrated in Figures 3 and 4. The screw shank 24 in the vicinity of the screw head 36 is formed with an annular washer receiving portion 38. The diameter of this washer receiving portion 38 is less than the external diameter of the threaded screw shank and has sufficient axial width to accommodate the flanges 22 as shown in Figure 4. After the screw 26 has been inserted within the complementary aperture of the plate 28, the screw retaining disc device 10 is telescopically associated with the screw shank as illustrated in Figure 3. By applying axial force in the direction indicated by the arrows, Figure 3, the fingers 18 are sprung out of the plane of the washer stock sufficiently to permit telescopic association of the parts. It will be noted that the washer is preferably applied with the flanges 22 extending away from the screw head. It will be apparent that the washer can be applied with greater ease when the flanges extend toward the entering extremity of the screw shank because of the presence of the smooth or rounded corners presented at the juncture of the flange with the finger stock.

When the retainer disc 10 reaches the position shown in Figure 4 adjacent the inner surface of the workpiece or plate 28, the resiliency of the fingers 18 causes the inner flanged margins thereof to be sprung back to their original position. The thread on the screw shank 24 projects radially beyond the inner surface of the flanges 22 sufficiently to prevent movement of the washer toward the entering end of the screw. By having the inner margin of the washer formed with an axial thickness which is substantially greater than the thickness of the thin washer stock, as by means of the flanges 22, there is no danger of the washer back-threading within the valley of the thread on the screw shank. The screw when thus secured in the plate 28 by the retaining washer device 10 may be said to be held captive. In other words, the combined washer and fastener is sometimes referred to as a captive screw device because it serves to secure the screw against separation from the workpiece.

It has been found practical to employ retainer washers of the present invention in operative association with screws equipped with a rolled or extruded thread. Such screws are formed with a screw thread by rolling between a pair of dies, a screw blank having a diameter which is equal to the diameter of the annular washer receiving portion in the vicinity of the screw head. When the threads are rolled on such a blank, the resulting maximum diameter of the shank across the rolled thread is greater than the unthreaded washer receiving portion adjacent the head. The axial extent or width of this washer receiving portion may be determined by the thickness of the workpiece with which the screw is to be associated. In the disclosed embodiment an annular washer receiving area of relatively small axial width is required because the switch box cover is relatively thin.

From the foregoing it will be apparent that the present invention contemplates a very simple yet efficiently operable snap-on type retainer for screws and the like. The retainer device is capable of being stamped and formed from relatively thin sheet metal stock. While the thin stock renders the fingers readily deflectible to facilitate telescopic association thereof with a screw shank, the increased axial width of the inner margin cooperates with the annular washer receiving portion of the screw member to positively prevent inadvertent separation of the parts after assembly. By having the resilient fingers connected with the outer annular body portion intermediate the extremities of the fingers, a relatively long arcuate inner margin is provided for interlocking with the screw without sacrificing resiliency. That is to say, the intermediate connection of the fingers with the annular body is of sufficiently limited cross-section to render the fingers readily yieldable or deflectible and yet the inner margin of the fingers is of considerable circumferential extent.

It will also be apparent that the inner marginal edges of the fingers may be axially deflected as by crimping or corrugating instead of bent laterally as illustrated in the drawings. The invention contemplates a snap-on sheet metal retainer in which the inner margin is so deflected by bending or otherwise as to afford increased overall thickness in that vicinity and thereby counteract the tendency of said inner margin to follow within the helical path of the thread. In the interest of avoiding the removal of plating by the inner margin of the fastener it is preferable that the fastener does not tightly crimp the unthreaded portion of the screw. A screw of the type shown herein may be conveniently produced by thread rolling. When rolled between dies, the portion of the shank immediately beneath the head may be left blank and the remaining portion formed with a rolled or extruded thread. Thus the invention has a very practical application in instances where a rolled threaded screw is to be employed.

Obviously the invention is not limited to the specific structural details disclosed herein but is capable of other modifications and changes without departing from the spirit and scope of the appended claims.

The invention is hereby claimed as follows:

1. A snap-on retainer for a fastener of the type having a shank, said shank having a threaded portion, a head at one end of said shank and an annular unthreaded washer receiving area adjacent said head of less diameter than the threaded shank portion, said retainer comprising a relatively thin sheet metal, washer-like member having an outer substantially continuous body portion, and an inner rim portion comprising a plurality of resilient circumferentially disposed fingers, the inner margins of which are formed so as normally to define a cylindrical flange surrounding a washer aperture smaller in diameter than the diameter of the threaded portion of the fastener shank with which the washer is adapted to be telescopically associated, said fingers being deflectible for permitting passage of the washer over said threaded portion to seat on said washer receiving area, said cylindrical flange extending axially along the shank in sleeved relation therewith when the washer is so seated and being of sufficient axial dimension to prevent the washer from tracking in the screw thread when the shank is turned.

2. A snap-on retainer for a fastener of the type having a shank, said shank having a threaded portion, a head at one end of said shank and an annular unthreaded washer receiving area adjacent said head of less diameter than the said shank portion, said retainer comprising a relatively thin sheet metal, washer-like member having an outer substantially continuous body portion, and an inner rim portion comprising a plurality of resilient circumferentially disposed fingers, the inner margins of which are of increased axial dimension and define a cylindrical wall surrounding a washer aperture smaller in diameter than the diameter of the threaded portion of the fastener shank with which the washer is adapted to be telescopically associated but larger than said unthreaded washer receiving area to provide a loose fit thereon, said fingers being deflectible for permitting passage of the washer over said threaded portion to seat on said washer receiving area, said cylindrical wall extending axially along the shank in sleeved relation therewith when the washer is so seated and being of sufficient axial dimension to prevent the washer from tracking in the screw thread when the shank is turned.

3. A snap-on retainer for a fastener of the type having a shank, said shank, having a threaded portion, a head at one end of said shank and an annular unthreaded washer receiving area adjacent said head of less diameter than the threaded shank portion, said retainer comprising a relatively thin sheet metal, washer-like member having an outer substantially continuous body portion, and an inner rim portion being circumferentially and radially severed to provide a plurality of resilient circumferentially disposed fingers, the inner margins of which are formed so as normally to define a cylindrical flange surrounding a washer aperture smaller in diameter than the diameter of the threaded portion of the fastener shank with which the washer is adapted to be telescopically associated, the inner margin of each of said fingers comprising a substantial portion of a circle, said fingers being deflectible for permitting passage of the washer over said threaded portion to seat on said washer receiving area, said cylindrical flange extending axially along the shank in sleeved relation therewith when the washer is so seated and being of sufficient axial dimension to prevent the washer from tracking in the screw thread when the shank is turned.

4. A snap-on retainer for a fastener of the type having a shank, said shank having a threaded portion, a head at one end of said shank and an annular unthreaded washer receiving area adjacent said head of less diameter than the threaded shank portion, said retainer comprising a relatively thin sheet metal, washer-like member having an outer substantially continuous body portion, a plurality of resilient fingers positioned along the inner margin of said body portion, each of said fingers constituting an arcuate section of substantial circumferential extension, the inner margins of said fingers cooperating to define an aperture smaller in diameter than the diameter of the threaded portion of the fastener shank with which the washer is adapted to be telescopically associated, and a connecting section of limited circumferential cross-sectional area connecting the intermediate portion of each finger with the inner margin of said annular body portion, whereby to facilitate deflection of the inner margin of each finger when initially applied to a fastener shank, the inner margin of each finger being laterally deflected to provide flange means having a sleeve portion adapted to embrace the unthreaded washer receiving area of the shank extending parallel to the axis thereof and being of sufficient axial dimension to prevent the washer from tracking in the screw thread when the shank is turned.

5. In combination with an apertured workpiece and the shank of a headed stud fastener extending through said workpiece, said shank being provided with a threaded portion and an annular unthreaded washer receiving area in the vicinity of the fastener head of less diameter than the threaded shank portion, which area has a diameter less than the maximum diameter of the shank, a stud retaining washer device comprised of relatively thin resilient sheet stock, said washer device including an external annular body portion, and a plurality of resilient fingers along the internal margin thereof, said fingers being bent along their inner margins to provide tubular flange means extending normally with respect to the plane of the washer and positioned in sleeved association with the annular washer receiving area of said fastener stud, the normal inner diameter defined by said fingers being less than the maximum diameter of the threaded portion of the fastener shank whereby to secure said fastener against disengagement from the workpiece, and greater than said washer receiving area to provide a loose fit thereon, the axial dimension of said tubular flange being such as to prevent the washer from tracking in the screw thread when said shank is turned.

6. In combination with an apertured workpiece and the shank of a headed screw member extending through said workpiece, the screw shank being provided with an unthreaded annular washer receiving area in the vicinity of the screw head which is less in diameter than the outer diameter of the threaded portion of the shank, a screw retaining washer device comprised of relatively thin resilient sheet stock, said washer device including an external annular body portion, and a plurality of resilient fingers along the internal margin thereof, the inner extremities of said fingers being of increased axial thickness as compared with the thickness of the washer stock and defining an aperture having a diameter less than the outer diameter of the screw thread, the inner extremity of each finger comprising a substantial arc of a circle, said inner extremities of the fingers being positioned in association with said annular washer receiving area and being formed to provide a sleeve portion contacting the shank, said sleeve portion being of sufficient axial dimension to prevent the washer from tracking in the screw thread, whereby to secure the screw member against disengagement from the workpiece.

EDMOND C. CROWTHER.

REFERENCES CITED

The following references are of record in the file of this patent:

UNITED STATES PATENTS

| Number | Name | Date |
|---|---|---|
| 643,045 | Denis | Feb. 6, 1900 |
| 1,037,010 | Irons | Aug. 27, 1912 |
| 1,429,117 | Thomas | Sept. 12, 1922 |
| 2,041,613 | Lincks | May 19, 1936 |
| 2,317,665 | Bredehoft | Apr. 27, 1943 |